(No Model.)

J. LANE.
PLANTING PLOW.

No. 296,851. Patented Apr. 15, 1884.

Witnesses.
William Sluyter.
H. B. Hobart.

Inventor.
John Lane.

N. PETERS. Photo-Lithographer, Washington, D. C.

UNITED STATES PATENT OFFICE.

JOHN LANE, OF HYDE PARK, ASSIGNOR TO THE HAPGOOD PLOW COMPANY, OF ALTON, ILLINOIS.

PLANTING-PLOW.

SPECIFICATION forming part of Letters Patent No. 296,851, dated April 15, 1884.

Application filed December 7, 1881. (No model.)

*To all whom it may concern:*

Be it known that I, JOHN LANE, of Hyde Park, in the county of Cook and State of Illinois, have invented a new and useful Improvement in Planting-Plows, which improvement is fully set forth in the following specification and accompanying drawings.

My invention relates to listing planting-plows; and it consists in certain improvements which will first be described, and afterward pointed out in the claim.

Figure 1:
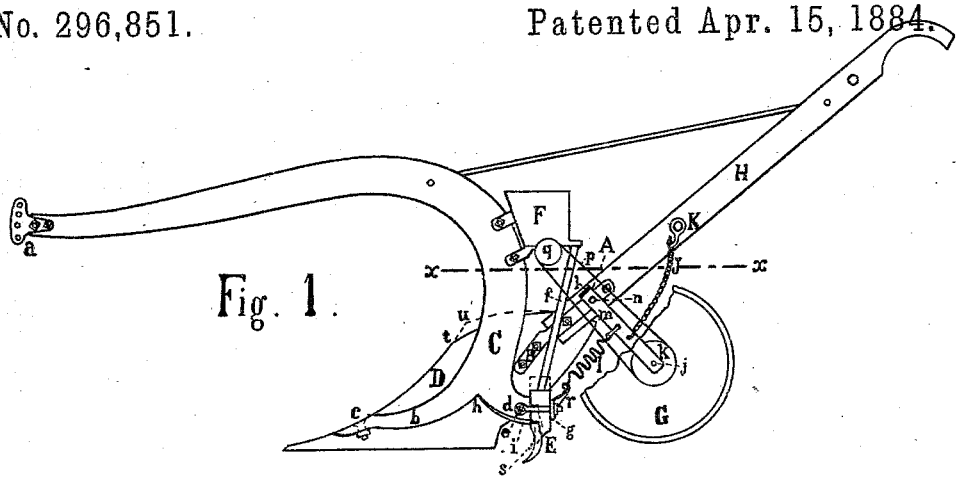
Figure 2:
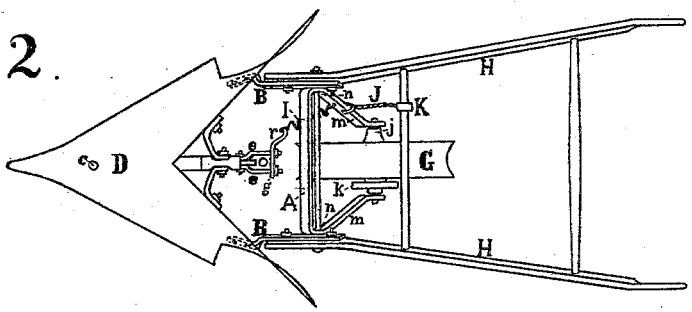
Figure 3:
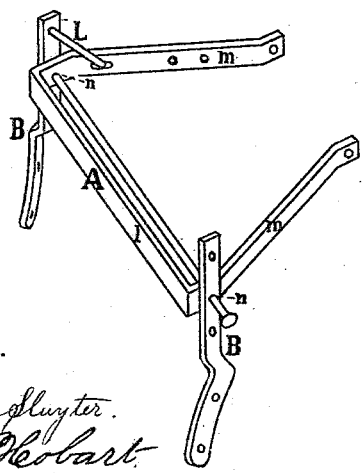

In the drawings like letters refer to like parts, in which Figure 1 is a side view of my improved planting-plow, taken on a line through the center of the plow. Fig. 2 is a top view of same, taken on and showing below the dotted line $x\ x$ in Fig. 1; and Fig. 3 is a perspective view enlarged of the yoke A and brackets B B.

C is a bent plow-beam, having thereto attached and carrying the listing-plow D, opening in advance a wide furrow, a drill-tooth, E, following, opening a slit along the said furrow, a dropping-box, F, having a pipe, $f$, connecting with the said drill-tooth, all of which may be of ordinary construction, as shown. The said drill-tooth and dropping-box may be attached directly to the rear edge of the beam, in any well-known manner, as shown. The said drill-tooth may consist of a pipe-like shank, upper part provided with a blade upon its lower end, and made adjustable vertically, and telescopic on the said pipe $f$, by which the corn or seed will drop from the dropping-box through the pipe $f$ into and through the shank of the drill-tooth, and the said drill-tooth adjustable vertically for deep or shallow planting, all of which is well known and will be understood by the drawings, and dotted lines in Fig. 1.

G is a rolling-wheel following on the track or slit of the drill-tooth, covering and packing the soil over the planted seed. The said wheel is attached on a shaft, $j$, which shaft also carries a drive-chain pulley, $k$, and the said shaft is loosely suspended in the yoke A, as shown in the drawings.

A is the yoke, having a closed end, $l$, with arms $m\ m$, and the said yoke may be pivoted in its connection with the plow at $n$, by which the wheel may have an up-and-down play movement; and B B are brackets attached to the mold-board and extending support to the yoke, as shown; and handles H H may be attached to the said brackets, as shown.

A drive-chain, $p$, communicates and gives motion from pulley $k$ to pulley $q$ in dropping the seed.

I sometimes use a brace, L, as shown in Fig. 3, by which the said wheel is held rigidly, or permitted to play only to the extent allowed by having the hole in the arm slotted in which the end of the brace L is seated.

In operation, the listing-plow cleans away in advance a wide shallow furrow, turning the soil and rubbish away to both sides of the plow, and when the mold-boards are constructed low along their top edge the loose soil from the under side of the furrow-slice will spin over the top of the mold-boards and fall in front of and about the drill-tooth, thus providing a bed of loose soil into which the seed may be planted; and the drill-tooth may be adjusted to work either in such loose soil or adjusted to work below the working of the listing-plow, as may be desired. The seed is dropped through the shank of the drill-tooth, and the drill-tooth opening a slit only, much of the soil will fall back and cover the seed, and the wheel following, on the track of the drill-tooth as a roller, will pack the soil over the seed.

I am aware that it is not new to place the wheel following the plow, and such I do not claim, broadly; but I am not aware that any one has hitherto constructed a planting-plow in the peculiar manner represented in the accompanying drawings.

Having thus set forth and described my invention, I will now point out and particularize what I claim as follows:

In a planting-plow, the bent plow-beam C, consisting of a single bar extending rearwardly from the draft-clevis, with its rear part bent curved downward under the mold-board of the plow, substantially as shown, in combination with the listing-plow D, attached to the foot end of the said beam, the drill-tooth, following the heel of the said beam, and adjustable vertically, the dropping-box F, with pipe *f*, and the wheel G, with yoke A, provided with pivotal connection with the plow, and handles H H, with brackets B B, attached to the mold-board, all substantially as and for the purpose set forth.

JOHN LANE.

Witnesses:
FRANK W. BARKER,
E. L. LANE.